(12) United States Patent
Iguchi

(10) Patent No.: US 9,671,728 B2
(45) Date of Patent: Jun. 6, 2017

(54) IMAGE PROCESSING APPARATUS FOR FORMING AND DECOLORING AN IMAGE ON A SHEET

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Ken Iguchi, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/259,298

(22) Filed: Sep. 8, 2016

(65) Prior Publication Data

US 2017/0113478 A1    Apr. 27, 2017

Related U.S. Application Data

(63) Continuation of application No. 14/921,062, filed on Oct. 23, 2015, now Pat. No. 9,471,015.

(51) Int. Cl.
*G03G 15/20* (2006.01)
(52) U.S. Cl.
CPC ................ *G03G 15/2039* (2013.01)
(58) Field of Classification Search
CPC .................... G03G 15/2039; G03G 15/205

USPC ........................................................ 399/341
See application file for complete search history.

(56) References Cited

U.S. PATENT DOCUMENTS

| 5,781,822 | A | 7/1998 | Nishiyama et al. |
| 8,115,976 | B2 | 2/2012 | Murakami |
| 8,478,151 | B2 | 7/2013 | Iguchi et al. |
| 9,104,947 | B2 | 8/2015 | Umetsu |
| 2014/0205339 | A1 | 7/2014 | Umetsu |
| 2014/0255054 | A1 | 9/2014 | Katayama |

OTHER PUBLICATIONS

U.S. Office Action for U.S. Appl. No. 14/921,062 mailed on Feb. 26, 2016.

*Primary Examiner* — Billy Lactaoen
(74) *Attorney, Agent, or Firm* — Amin, Turocy & Watson LLP

(57) ABSTRACT

An image processing apparatus comprises an image decoloring unit, an image forming unit, a heater and a control unit. The image decoloring unit decolors an image formed on a sheet with a decolorable color material by heating the sheet. The image forming unit forms an image on a sheet with a decolorable color material. The heater thermally fixes the image formed by the image forming unit on the sheet. The control unit carries out a control processing so that the formation of an image with a decolorable color material is different before and after a specified time elapses from the moment the image decoloring unit completes a decoloring processing.

8 Claims, 13 Drawing Sheets

FIG.4

|  | PRINT WITH DECOLORABLE COLOR MATERIAL | PRINT WITH NON-DECOLORABLE COLOR MATERIAL |
|---|---|---|
| TIME IS SHORT AFTER DECOLORING PROCESSING | IMPOSSIBLE | POSSIBLE |
| TIME IS LONG AFTER DECOLORING PROCESSING | POSSIBLE | POSSIBLE |

FIG.7

|  |  | PRINT WITH DECOLORABLE COLOR MATERIAL | PRINT WITH NON-DECOLORABLE COLOR MATERIAL |
|---|---|---|---|
| TIME IS SHORT AFTER DECOLORING PROCESSING | DECOLORED SHEET CASSETTE | IMPOSSIBLE | POSSIBLE |
|  | NORMAL CASSETTE | POSSIBLE | POSSIBLE |
| TIME IS LONG AFTER DECOLORING PROCESSING | DECOLORED SHEET CASSETTE | POSSIBLE | POSSIBLE |
|  | NORMAL CASSETTE | POSSIBLE | POSSIBLE |

FIG.11

|  |  | PRINT WITH DECOLORABLE COLOR MATERIAL | PRINT WITH NON-DECOLORABLE COLOR MATERIAL |
|---|---|---|---|
| TIME IS SHORT AFTER DECOLORING PROCESSING | DECOLORED SHEET CASSETTE | LOW SPEED | NORMAL SPEED |
|  | NORMAL CASSETTE | NORMAL SPEED | NORMAL SPEED |
| TIME IS LONG AFTER DECOLORING PROCESSING | DECOLORED SHEET CASSETTE | NORMAL SPEED | NORMAL SPEED |
|  | NORMAL CASSETTE | NORMAL SPEED | NORMAL SPEED |

# IMAGE PROCESSING APPARATUS FOR FORMING AND DECOLORING AN IMAGE ON A SHEET

CROSS REFERENCE TO RELATED APPLICATIONS

This application is a Continuation of application Ser. No. 14/921,062 filed Oct. 23, 2015, the entire contents of which are incorporated herein by reference.

FIELD

Embodiments described herein relate generally to an image processing apparatus having a function of forming an image on a sheet and a function of decoloring the image formed on the sheet.

BACKGROUND

An image processing apparatus is known which comprises an image forming unit for forming an image on a sheet with a decolorable color material and thermally fixing the image on the sheet and an image decoloring unit for decoloring the image formed with the decolorable color material by heating the sheet. In the image processing apparatus, a sheet subjected to decoloring processing by the image decoloring unit is conveyed to the image forming unit to be formed with an image.

A temperature of the sheet on which the image is decolored through a heating processing is temporarily maintained to be high. If an image is formed on the high-temperature sheet with a decolorable color material and fixed, then because of the heat of the sheet, the decolorable color material will be decolored, which disenables the printing of a normal image.

DESCRIPTION OF THE DRAWINGS

FIG. 4 is a diagram exemplarily summarizing the operation controls according to a first embodiment;

FIG. 7 is a diagram exemplarily summarizing the operation controls according to a second embodiment;

FIG. 11 is a diagram exemplarily summarizing the operation controls according to a third embodiment;

DETAILED DESCRIPTION

Figure 1:
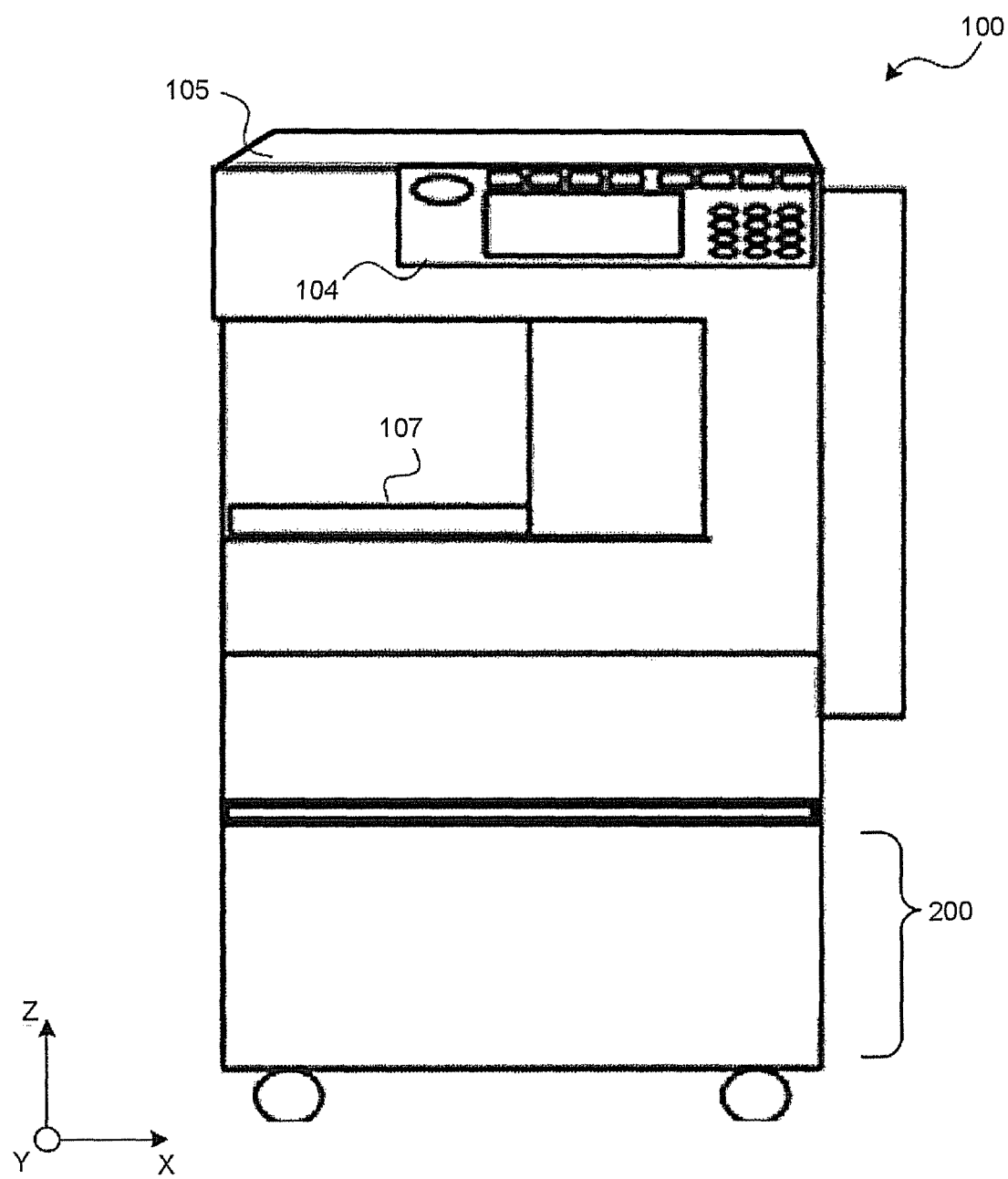
FIG. 1 is an external view of an image processing apparatus according to an embodiment.

In accordance with embodiments, an image processing apparatus comprises an image decoloring unit, an image forming unit, a heater and a control unit. The image decoloring unit heats a sheet to decolor an image formed on the sheet with a decolorable color material. The image forming unit forms an image on a sheet with a decolorable color material. The heater thermally fixes the image formed by the image forming unit on the sheet. The control unit carries out a control processing so that the operation of image forming with a decolorable color material is different before and after a specified time elapses from the moment the image decoloring unit completes a processing.

In accordance with embodiments, an image processing apparatus can form an image on a decolored sheet as it is. If there is a sheet that should be decolored during a no-print or no-copy period, the image processing apparatus of the embodiment carries out a decoloring processing for the sheet. The image processing apparatus of the embodiment is capable of printing an image with a decolorable color material or a non-decolorable color material. Further, in the embodiment, toner is described as an example of the color material; however, an image may also be formed with ink. Further, the 'decolor' mentioned herein means that an image formed in a color different from the fundamental color of a sheet (achromatic colors such as white and black in addition to chromatic colors) cannot be seen visually. Apart from achromatizing (transparentizing) an image formed in a color different from the fundamental color of a sheet, the 'invisible visually' also refers to changing the color of an image formed in a color different from the fundamental color of a sheet to be identical or similar to the fundamental color of the sheet.

The image processing apparatus of the embodiment is provided with at least three cassettes, including a non-decolored sheet cassette for accommodating a sheet which is used but not decolored, a decolored sheet cassette for accommodating a thermally decolored sheet and a normal cassette for accommodating a new sheet. The user can designate from which one of the decolored sheet cassette and the normal cassette a sheet is fed for the formation of an image.

The decolorable color material is fixed on a sheet at a specified fixation temperature or above and decolored if heated at a specified decoloring temperature or above higher than the fixation temperature. Thus, the decolorable color material is decolored if the temperature reaches a temperature more than specified decoloring temperature during a printing process. On the other hand, as a sheet immediately subjected to the decoloring processing carries heat, in a case in which an image is printed on the sheet with a decolorable color material at the fixation temperature, the temperature of the sheet plus the heat of the sheet makes the temperature close to the decoloring temperature. If a fixation processing is carried out during a printing processing at a temperature close to the decoloring temperature, then the print density is reduced, resulting in no output of a normal image.

To solve the problem above, the image processing apparatus of each of the following embodiments carries out a control processing so that the operation of image forming with a decolorable color material is different before and after a specified time elapses from the moment the image decoloring unit completes a decoloring processing.

In a first embodiment, when a print or copy job is executed, an image processing apparatus prevents the execution of a print job with a decolorable color material during the period from the completion of a decoloring processing to the elapse of a specified cooling time.

If the time elapsing from the completion of a decoloring processing is shorter than a predetermined time, an image processing apparatus of the second embodiment carries out the printing of an image on a sheet fed from the normal cassette with a decolorable color material but prevents the printing of an image on a sheet fed from the decolored sheet cassette with a decolorable color material. If the specified time elapses, the image processing apparatus of the second embodiment can carry out the printing of an image on a sheet fed from either of the normal cassette and the decolored sheet cassette.

In a third embodiment, an image processing apparatus carries out a control processing so that the printing based on a decolorable color material is executed at a speed lower than the normal conveyance speed in the case where a short time elapses from the completion of a decoloring processing. In other words, the image processing apparatus of the third embodiment carries out a control processing so that the time when an image printed with a decolorable color material is heated for fixation is longer than usual.

Further, in the case of the use of a non-decolorable color material, an image is irremovable no matter how high the temperature of a sheet is. Therefore, the printing based on a non-decolorable color material is carried out in the normal way no matter how long the specified time elapses.

Each Embodiment is described below with reference to accompanying drawings.

First Embodiment

In the first embodiment, an image processing apparatus measures the time elapsing from the performance completion of a decoloring processing to the start of a printing processing. If the time measured is shorter than a specified time, the image processing apparatus carries out a control processing to conduct the execution of a print job with a non-decolorable color material and prevent the execution of a print job with a decolorable color material. If the time measured is longer than a specified time, then a print job can be carried out with a non-decolorable color material or a decolorable color material.

Figure 2:
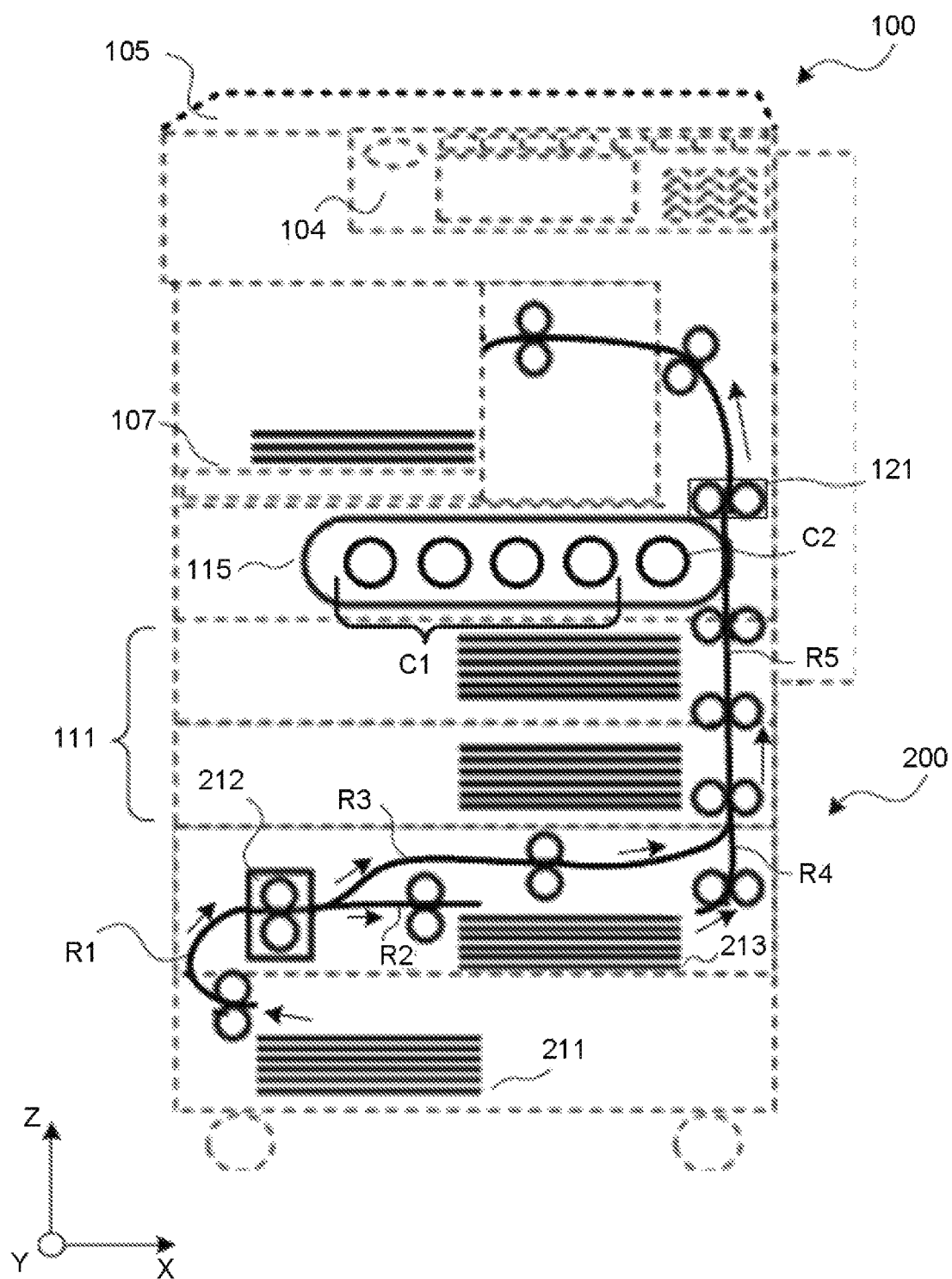
FIG. 2 is a schematic diagram exemplifying the internal structure of the image processing apparatus according to the embodiment.

FIG. 1 is an external view of the image processing apparatus according to the embodiment; and FIG. 2 is a schematic diagram exemplifying the internal structure of the image processing apparatus. Further, the X axis, the Y axis and the Z axis are shared in FIG. 1 and FIG. 2. The arrow shown in FIG. 2 represents a sheet conveyance direction.

The image processing apparatus 100 shown in FIG. 2 is provided with an normal cassette 111 (a second accommodation unit) for stacking and accommodating a new sheet or a sheet which is being used but not used at least on one side. The image processing apparatus 100 comprises an image forming unit 115 for forming an image on a sheet and a discharge tray 107 for stacking a sheet on which an image is formed. The image forming unit 115 has a cartridge C1 which accommodates a non-decolorable color material serving as a normal color material and a cartridge C2 which accommodates a decolorable color material which is decolored at a specified decoloring temperature or above. Further, the image processing apparatus 100 comprises a heater 121 for heating and pressing the sheet on which an image is formed to fix the image on the sheet.

The image processing apparatus 100 comprises a conveyance path R5 which conveys a sheet from the normal cassette 111, through the image forming unit 115, to the discharge tray 107. Further, the image processing apparatus 100 comprises an operation panel 104 which receives a parameter value such as 'print copies' input by the user or a processing start instruction given by the user and displays the progress status of a job. The image processing apparatus 100 comprises a reading unit 105 for reading a document sheet placed on a transparent glass plate. The image read by the reading unit 105 is output to the image forming unit 115 and formed on a sheet (copy processing).

An image decoloring apparatus 200 is arranged on the lower part of a main body of the image processing apparatus 100. The image decoloring apparatus 200 can be alternatively arranged on the main body of the image processing apparatus 100 or provided as an individual.

The image decoloring apparatus 200 comprises a non-decolored sheet cassette 211, a decoloring unit 212 and a decolored sheet cassette 213 (a first accommodation unit). The non-decolored sheet cassette 211 accommodates a sheet on which an image is formed with a color material which is decolored at a specified decoloring temperature or above. The decolored sheet cassette 213 accommodates a sheet which is reusable as the image formed on the sheet formed with a color material is thermally decolored by the decoloring unit 212. The decoloring unit 212 heats, by using a heat source, a sheet fed from the non-decolored sheet cassette 211 at a specified decoloring temperature or above. In this way, the decoloring unit 212 decolors the color material on the sheet to decolor an image formed with the color material. The decolored sheet cassette 213 stacks and accommodates a sheet decolored by the decoloring unit 212.

The image decoloring apparatus 200 comprises a conveyance path R1 for conveying a sheet from the non-decolored sheet cassette 211 to the decoloring unit 212 and a conveyance path R2 for conveying a sheet from the decoloring unit 212 to the decolored sheet cassette 213.

Further, the image decoloring apparatus 200 comprises a conveyance path R4 with one end connected with the conveyance path R5 in the main body of the image processing apparatus 100 and the other end connected with the decolored sheet cassette 213. If the image decoloring apparatus 200 is optionally mounted on the main body of the image processing apparatus 100, then the conveyance path R2 can be connected with the conveyance path R4, and the sheet accommodated in the decolored sheet cassette 213 is also fed to the inside of the main body. In this way, the image processing apparatus 100 is capable of causing the image forming unit 115 to form an image on a sheet fed from the decolored sheet cassette 213 and then discharging the sheet to the discharge tray 107 through the conveyance paths R4 and R5.

The image decoloring apparatus 200 comprises a conveyance path R3 branching off from the conveyance path R2 at the downstream side of the decoloring unit 212 and connected with the conveyance path R5. Through the conveyance path R3, a sheet decolored by the decoloring unit 212 is directly conveyed to the image forming unit 115 to be formed with an image instead of being accommodated in the decolored sheet cassette 213. With this structure, the image processing apparatus 100 can feed a sheet from the non-decolored sheet cassette 211 if there are no sheets in the decolored sheet cassette 213 and conveys the sheet to the image forming unit 115 as it is after decoloring the sheet using the decoloring unit 212.

The mounting of the image decoloring apparatus 200 on the image processing apparatus 100 enables the image processing apparatus 100 to execute a series of operations, including: decoloring an image by using the decoloring unit 212 and forming an image on the decolored sheet by using the image forming unit 115.

Figure 3:
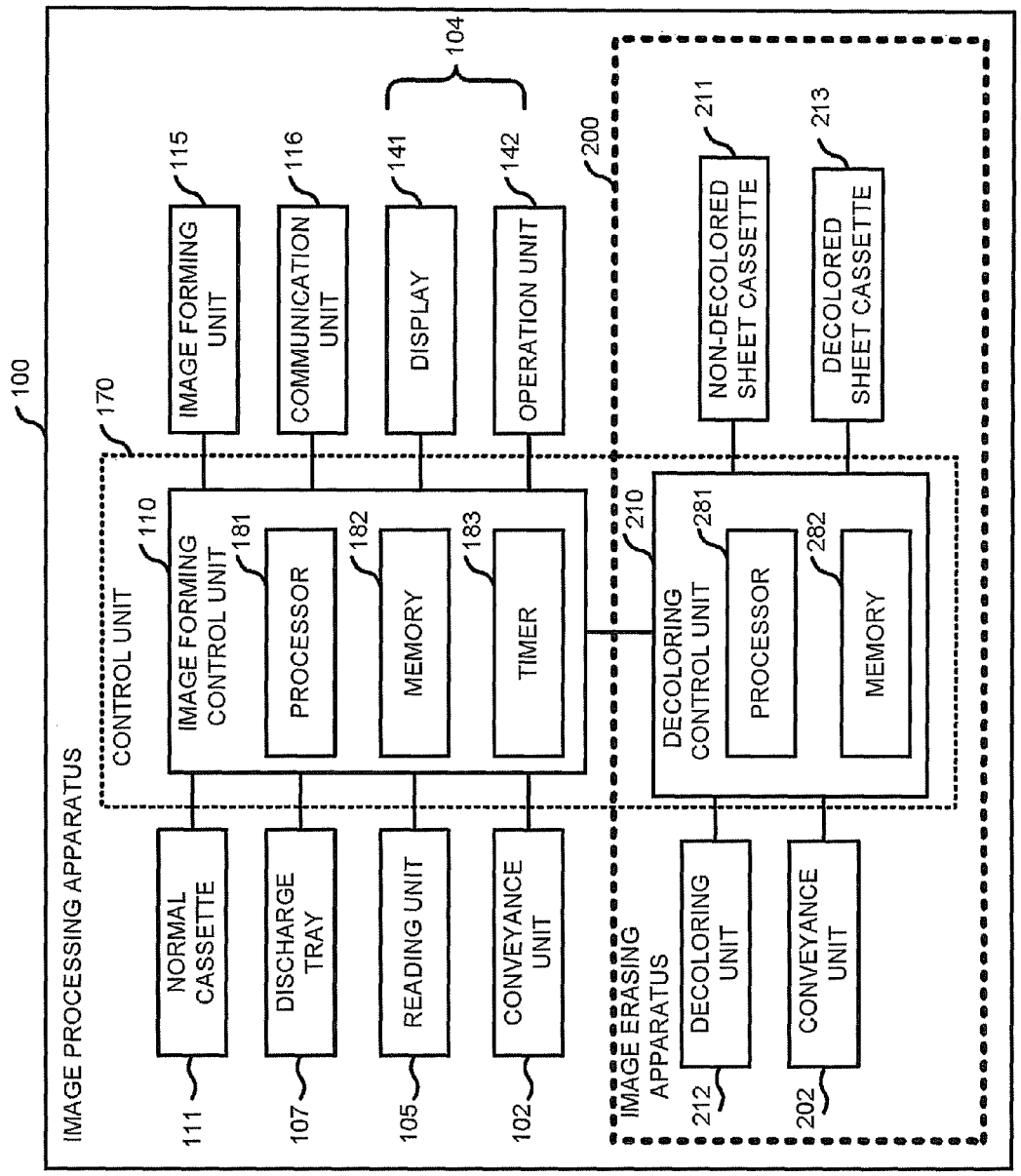
FIG. 3 is a block diagram exemplifying the structure of the image processing apparatus according to the embodiment.

FIG. 3 is a block diagram exemplifying the structure of the image processing apparatus 100 according to the embodiment. The image processing apparatus 100 comprises an image formation control unit 110 at least provided with a processor 181, a memory 182 and a timer 183. The processor 181 is an arithmetic processing device such as a CPU (Central Processing Unit). The processor 181 executes the programs stored in the memory 182 to realize various functions. The memory 182 is a unit including a main storage device which stores data in a volatile manner and directly inputs/outputs data into/from the processor 181, or a unit including an ROM or an auxiliary storage device which stores programs or data in a nonvolatile manner. With this structure, the image formation control unit 110 collectively controls the main body units of the image processing apparatus 100.

The timer 183 is a real-time clock for timing. The processor 181 acquires time information from the timer 183 and updates the internal time thereof.

The image processing apparatus 100 has a communication unit 116 which receives a print job from a personal computer according to an instruction from the image formation control unit 110 and returns a telegraphic message indicating the result or status of a processing to the personal computer serving as sending source.

The normal cassette 111, the discharge tray 107 and the reading unit 105 shown in FIG. 3 are identical to those described above. The operation panel 104 has a display 141 serving as a flat liquid crystal monitor and an operation unit 142 consisting of a touch panel or physical buttons. The conveyance unit 102 includes a conveyance path R5 which conveys a sheet to each unit according to an instruction from the image formation control unit 110.

The image decoloring apparatus 200 comprises a decoloring control unit 210. The decoloring control unit 210, which is a unit for collectively controlling each unit in the image decoloring apparatus 200, is provided with a processor 281 and a memory 282. The processor 281 controls the internal units of the image decoloring apparatus 200 according to the data or program codes stored in the memory 282. The decoloring control unit 210 may also be partially or wholly installed with a circuit such as an ASIC (application specific integrated circuit). Further, the functions of the decoloring control unit 210 may also be in the charge of the image formation control unit 110 of the image processing apparatus 100.

The non-decolored sheet cassette 211, the decolored sheet cassette 213 and the decoloring unit 212 shown in FIG. 3 are identical to those described above. The conveyance unit 202 includes conveyance paths R1, R2, R3 and R4 which convey sheets to each unit according to an instruction from the decoloring control unit 210.

It is assumed that the structure including the image formation control unit 110 and the decoloring control unit 210 functions as a control unit 170. That is, the control unit 170 collectively controls all the units in the image processing apparatus 100 containing the image decoloring apparatus 200.

FIG. 4 is a table exemplarily summarizing the operation controls according to the first embodiment. If a specified time does not elapse and the time elapsing is short than the specified time after the decoloring processing is carried out, the decolored sheet carries heat, and therefore a print job with the discolorable color material cannot be normally carried out. Thus, the execution of a print job with a decolorable color material is prevented. On the other hand, if the specified time is elapsing after the decoloring processing is carried out, it is assumed that the decolored sheet is placed for a long time until it is cooled, and then the execution of a print job with a decolorable color material is allowed. Moreover, the execution of a print job with a non-decolorable color material is allowed no matter how long the specified time elapses.

Figure 5:
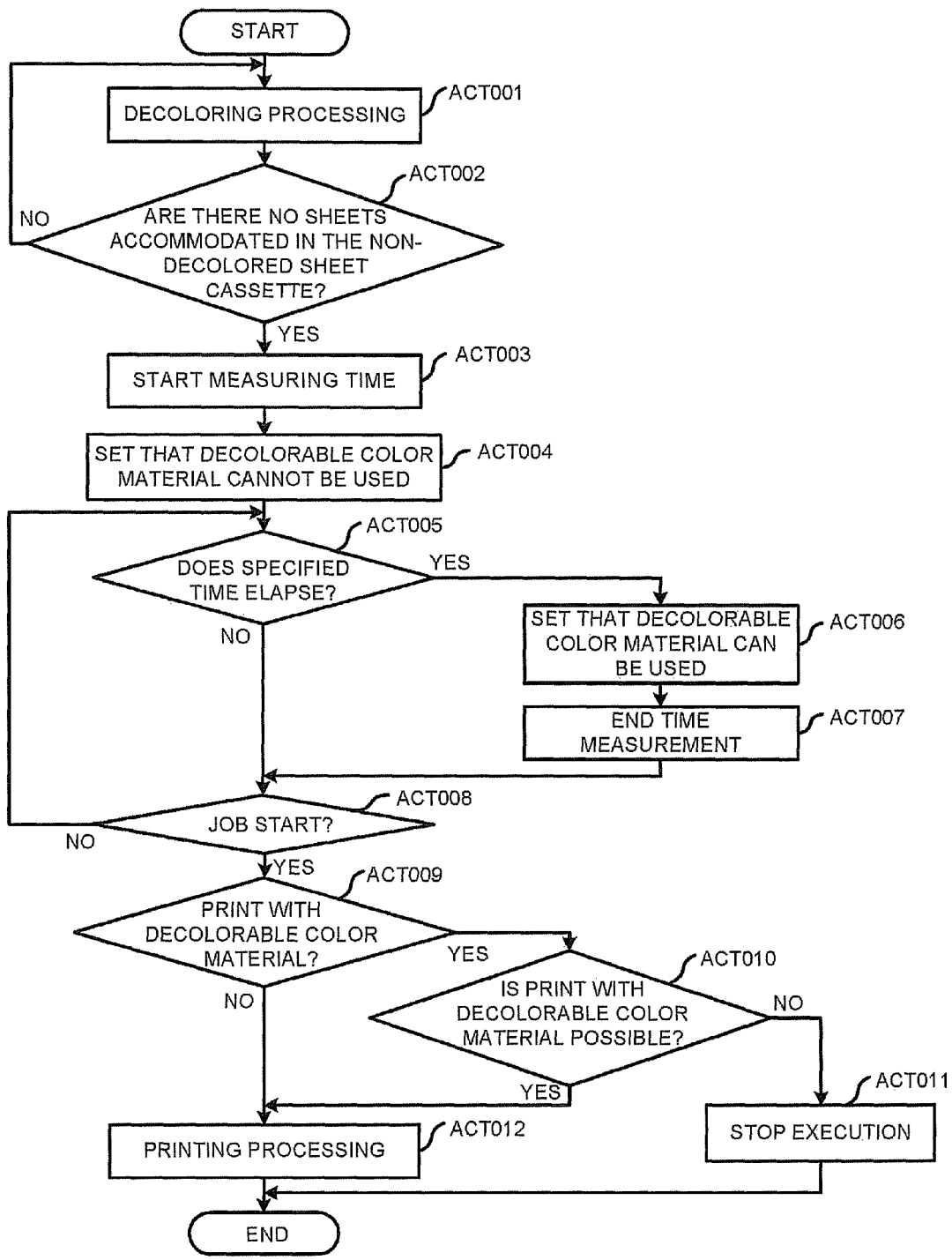
FIG. 5 is a flowchart exemplifying the operations carried out according to the first embodiment.

FIG. 5 is a flowchart exemplifying the operations carried out by the image processing apparatus 100 according to the first embodiment. The job input by the user, although described as a print job in the present example, may also be a copy job.

The image processing apparatus 100 carries out an image decoloring processing during a period in which no print job is received from the user (Act 001). In Act 001, the decoloring control unit 210 of the image decoloring apparatus 200 activates the conveyance unit 202 to convey the sheet accommodated in the non-decolored sheet cassette 211 to the decoloring unit 212. The decoloring control unit 210 activates the decoloring unit 212 to thermally decolor the sheet and activates the conveyance unit 202 to convey the decolored sheet to the decolored sheet cassette 213. Act 001 is executed until no sheets are accommodated in the non-decolored sheet cassette 211 (Act 002: Loop of No).

If the image decoloring processing is ended as no sheets need to be decolored (Act 002: Yes), the control unit 170 starts measuring time according to the time acquired from the timer 183 (Act 003).

The control unit 170 sets that the decolorable color material is unusable (in other words, sets that a print job with the decolorable color material cannot be executed) (Act 004). The memory 182 stores first flag data which represents whether or not a decolorable color material is usable, and it is set that the use of a decolorable color material is prohibited by rewriting the first flag data to a specified value.

The control unit 170 determines whether or not a specified time elapses from the start of the time measurement (Act 005). The specified time is a period of time after which at least a sheet is cooled and a print job can be normally executed even using a decolorable color material. The specified time is calculated and set in advance at the time of design. Further, the value of the specified time can be changed in practical applications due to also depending on the temperature of the place where the image processing apparatus 100 is arranged. In this case, for example, an input is received from the user through the operation panel 104, and the value of the specified time is set according to the received value.

If the time elapsing is shorter than the specified time (Act 005: No), the control unit 170 determines whether or not a job start instruction is input by the user (Act 008). The processing returns to Act 005 if no job start instruction is input by the user (Act 008: No). On the other hand, if the specified time elapses (Act 005: Yes), the first flag data is rewritten to allow the use of a decolorable color material (in other words, allow the execution of a print job with a decolorable color material) (Act 006), and the time measurement is ended (Act 007). Then, whether or not a job is started is determined (Act 008).

If the execution of a job is started (Act 008: Yes), the control unit 170 determines, with reference to the parameters contained in the data of the job, whether or not the job is a print job based on a decolorable color material (Act 009). If the job is not a print job based on a decolorable color material (Act 009: No), the print job is executed with a non-decolorable color material (Act 012). On the other hand, if the job is a print job based on a decolorable color material (Act 009: Yes), the control unit 170 determines, with reference to the value of the first flag data, whether or not the execution of a print job based on a decolorable color material is allowed (Act 010). As a normal image may not be obtained in the case where the execution of a print job based on a decolorable color material is not allowed (Act 010: No), the control unit 170 stops the execution of the job (Act 011). Meanwhile, the operation panel 104 may display a message indicating that the job cannot be executed. On the other hand, if the execution of a print job based on a decolorable color material is allowed (Act 010: Yes), the job is executed with a decolorable color material (Act 012).

Figure 6:
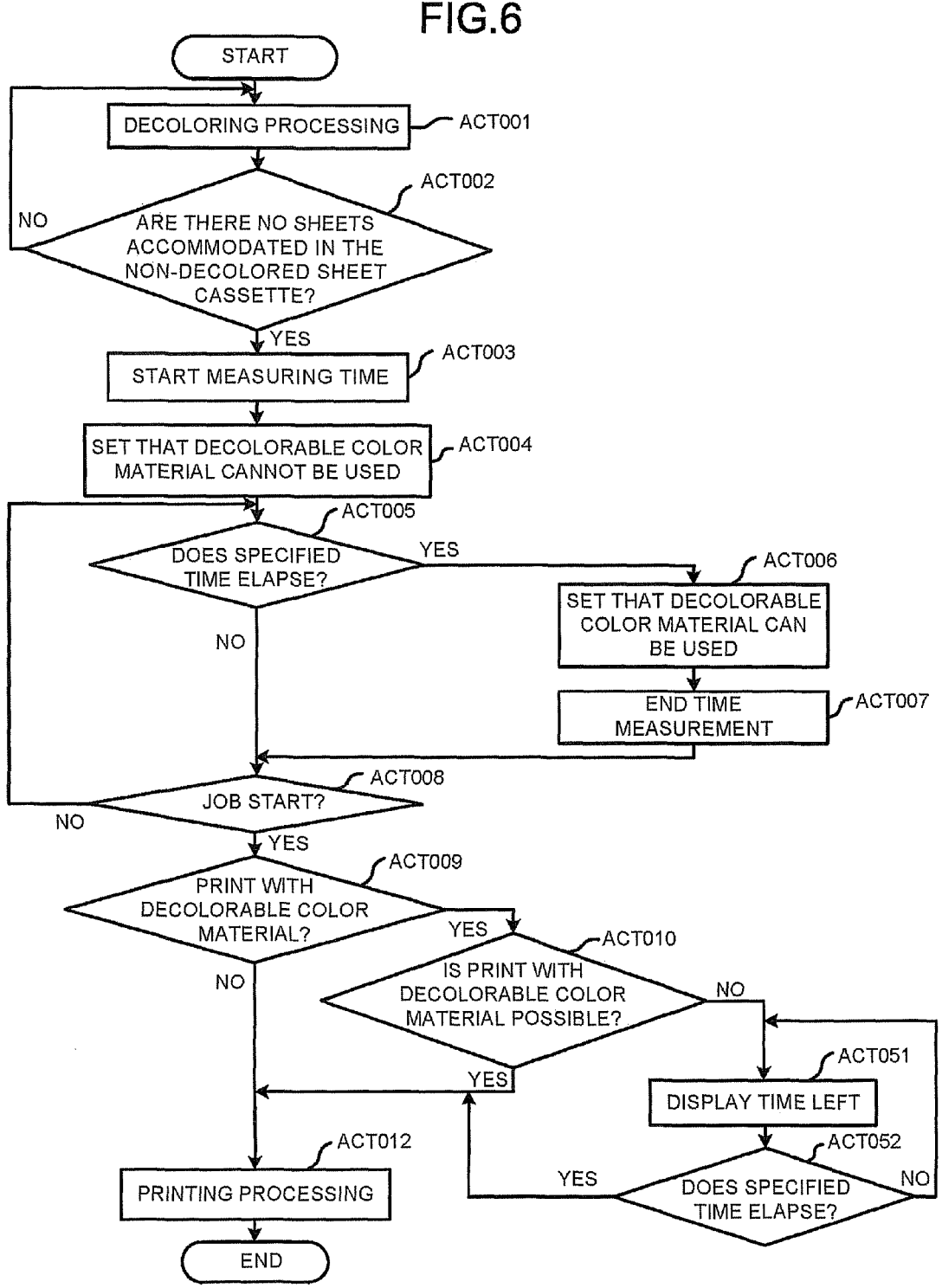
FIG. 6 is a flowchart exemplifying the operations carried out according to the first embodiment.

In the flowchart shown in FIG. 5, there is an operation example in which a job cannot be executed during the period from the completion of a decoloring processing to the elapse of a specified time; however, there may be an application in which by standing by until reaching to the specified time, a job is executed after a specified time elapses. FIG. 6 shows this operation example. Acts 001-010 shown in FIG. 6 are identical to Acts 001-010 shown in FIG. 5 and are therefore not described here repeatedly. If the execution of a print job based on a decolorable color material is not allowed (Act 010: No), the control unit 170 activates the operation panel 104 to display the time left before the specified time is up (Act 051). The control unit 170 keeps executing the display control of Act 051 until the specified time elapses (Act 052: No). If the specified time elapses (Act 052: Yes), the control unit 170 executes a print job with a decolorable color material (Act 012).

As described in the present embodiment, the formation of an image with a decolorable color material is prevented until a specified time elapses, thus inhibiting the decoloring caused by the heat of a sheet and guaranteeing the formation of a normal image.

Second Embodiment

In the first embodiment, an installation example is described which stops the execution of a job with a decolorable color material until a specified time elapses. In the second embodiment, the sheet in the normal cassette 111 is used while the sheet accommodated in the decolored sheet cassette 213 is prevented from being used in a case in which a specified time does not elapse after the completion of a decoloring processing. Further, the apparatus of the second embodiment has the same structure with that of the first embodiment.

FIG. 7 is a table exemplarily summarizing the operation controls in the second embodiment. In the second embodiment, a sheet can be fed from the normal cassette 111, but cannot be fed from the decolored sheet cassette 213, at the time of the execution of a print job with a decolorable color material if the time elapsing from the completion of a decoloring processing is short, not reaching a specified time. In the case where a long time elapses from the completion of a decoloring processing or a print job is executed with a non-decolorable color material, the sheet accommodated in either of the cassettes is applicable. In this case, a sheet is fed from a cassette set by default or a cassette designated by the user.

Figure 8:
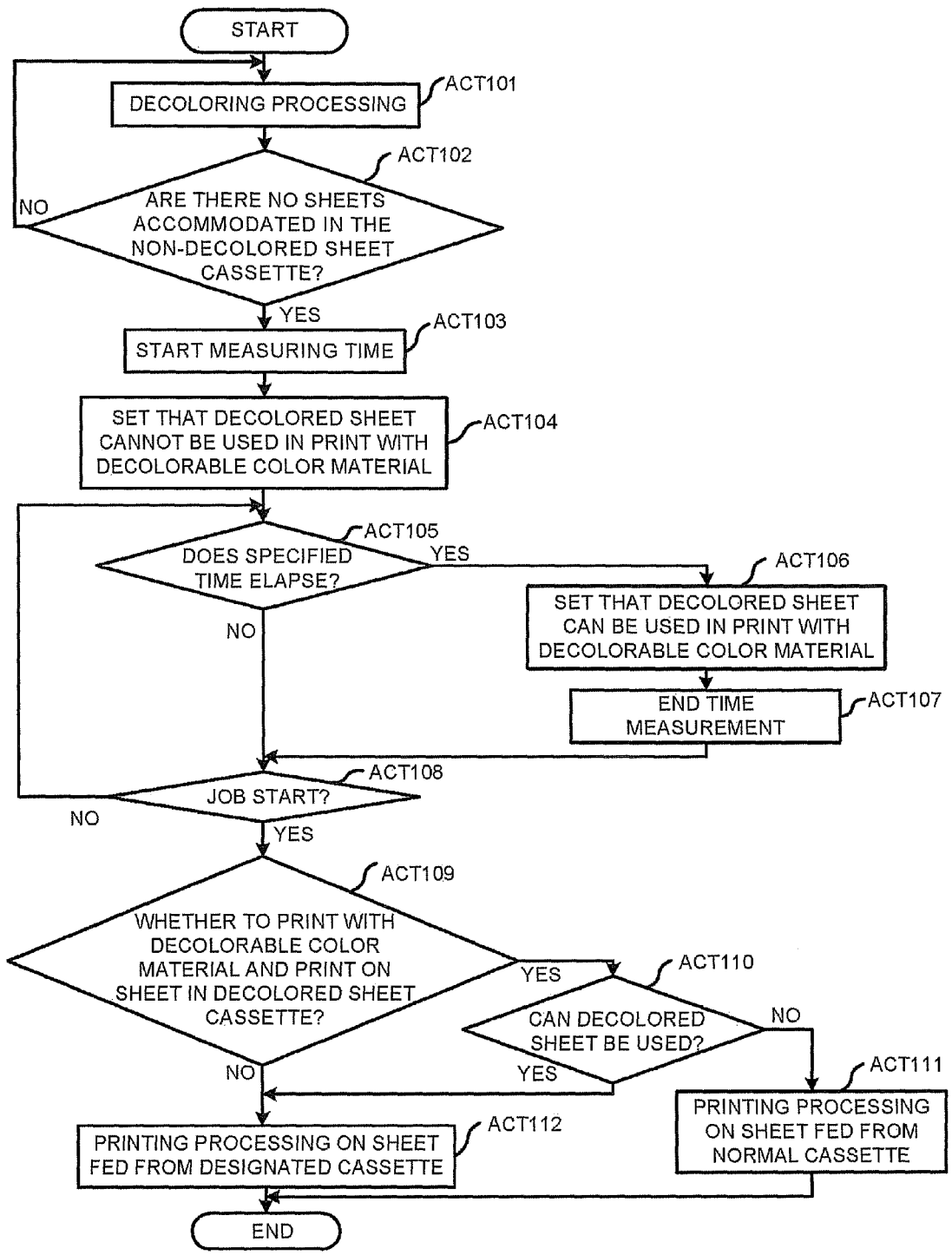
FIG. 8 is a flowchart exemplifying the operations carried out according to the second embodiment.

FIG. 8 is a flowchart exemplifying the operations carried out by the image processing apparatus 100 according to the second embodiment. Acts 101-103 carried out in the second embodiment are identical to those carried out in the first embodiment and are therefore not described repeatedly here. The control unit 170 starts measuring time (Act 103) and sets that the sheet accommodated in the decolored sheet cassette 213 cannot be used for the printing based on a decolorable color material (Act 104). In the second embodiment, the setting is carried out by writing a specific value into the second flag data pre-stored in the memory 182.

If the time elapsing is shorter than the specified time (Act 105: No), like the first embodiment, the control unit 170 determines whether or not there is a print job start instruction (Act 108), and the processing returns to Act 105 if there are no print job start instructions (Act 108: No).

If the specified time elapses (Act 105: Yes), the control unit 170 changes the value of the second flag data to allow the use of the sheet in the decolored sheet cassette 213 (Act 106). The control unit 170 ends the measurement of time (Act 107), and the processing proceeds to Act 108.

If a print job start instruction is received (Act 108: Yes), the control unit 170 determines whether or not the job is a job to be executed with a decolorable color material and a job to be executed on a sheet fed from the decolored sheet cassette 213 (Act 109). The control unit 170 makes the determination of Act 109 with reference to a parameter or default value designated by the user when the job is input. If the result of the determination of Act 109 is 'No' (Act 109: No), the user starts executing a print job on a sheet which is accommodated in the designated (default cassette) cassette when the job is input (Act 112). The used cassette may be the decolored sheet cassette 213 or the normal cassette 111.

Further, on the other hand, if the result of the determination of Act 109 is 'Yes' (Act 109: Yes), the control unit 170 determines, with reference to the second flag data, whether or not the sheet accommodated in the decolored sheet cassette 213 (Act 110) is usable. In the case where the second flag data represents that the sheet accommodated in the decolored sheet cassette 213 is unusable (Act 110: No), the control unit 170 carries out a control processing to feed a sheet from the normal cassette 111 (Act 111). In the case where the second flag data represents that the sheet accommodated in the decolored sheet cassette 213 is usable (Act 110: Yes), the control unit 170 carries out a control processing to feed a sheet from a user-designated cassette (or a default cassette) for printing (Act 112).

Figure 9:
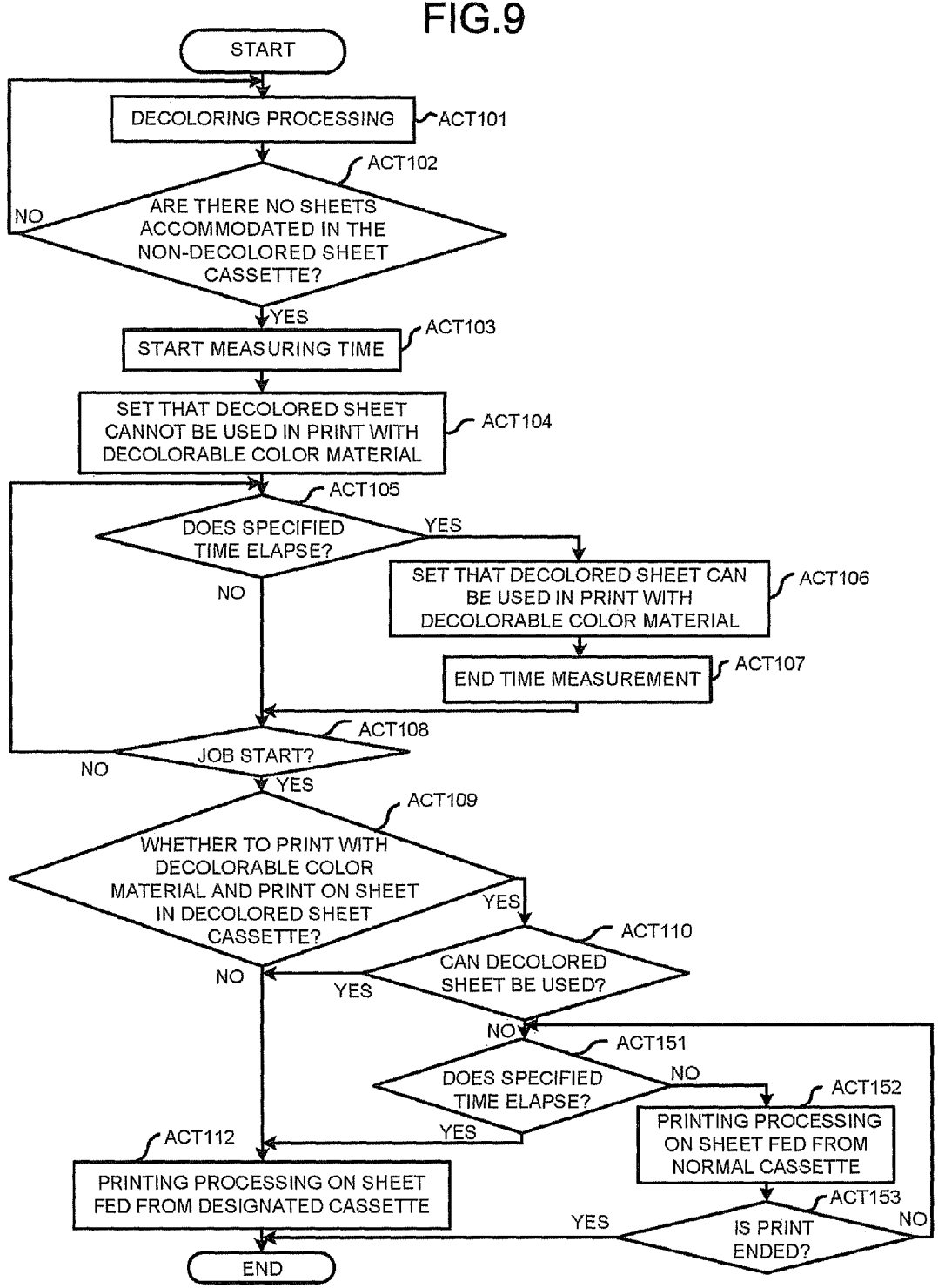
FIG. 9 is a flowchart exemplifying the operations carried out according to the second embodiment.

Further, there is a case in which the specified time is up during the execution process of a job of carrying out a multi-sheet printing processing. In this case, the cassette from which a sheet is fed may be switched from the normal cassette 111 to the decolored sheet cassette 213 during the execution process of the job. FIG. 9 exemplifies the operations carried out in this case. Acts 101-110 shown in FIG. 9 are identical to those shown in FIG. 8. In Act 110, if the second flag data represents that the sheet accommodated in the decolored sheet cassette 213 is unusable (ACT 110: No), the control unit 170 determines whether or not the specified time elapses (Act 151). Herein, if the time elapsing is shorter than the specified time (Act 151: No), a control processing is carried out so that a sheet is fed from the normal cassette 111 and printed (Act 152). The control unit 170 determines whether or not the execution of the job is ended (Act 153) and if so (Act 153: Yes), ends the processing. If the execution of the job is not ended (Act 153: No), the control unit 170 causes the processing to return to Act 151 to determine whether or not the specified time elapses (Act 151). By determining, for each sheet, whether or not a specified time elapses, the control unit 170 switches the cassette from which a sheet is fed once the specified time elapses during the execution process of a job.

According to the present embodiment, a print job may also be executed on a new sheet with a decolorable color material even before a specified time elapses.

Third Embodiment

In the third embodiment, an image processing apparatus 100 allows the feed of a sheet from the decolored sheet cassette 213 even before a specified time elapses. In this case, a control processing is carried out so that the heating temperature of the heater 121 heating the sheet from the decolored sheet cassette 213 is lower than that of a case of conveying and heating a normal-temperature sheet and that the speed at which the sheet fed from the decolored sheet cassette 213 is conveyed via the heater 121 is lower than a predetermined speed at which a normal-temperature sheet is conveyed.

Through the control, even if an image is formed on a sheet fed from the decolored sheet cassette 213 with a decolorable color material in a case in which the time elapsing fails to reach a specified time, the sheet is supplied with the same amount of heat with a normal-temperature sheet.

Figure 10:
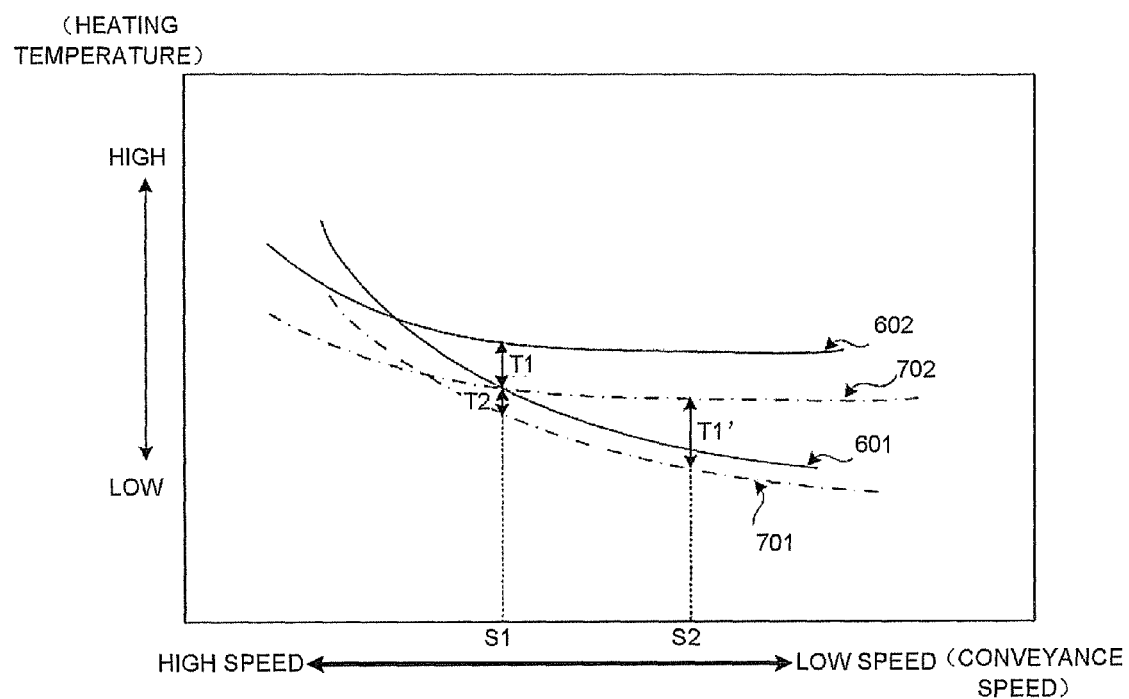
FIG. 10 is a diagram illustrating the relationship between a heating temperature and a conveyance speed and a diagram illustrating a fixed line and a decoloring line corresponding to the temperature of a sheet.

FIG. 10 is a diagram illustrating the relationship between a conveyance speed and a heating temperature. In FIG. 10, a line 601 represents a fixable line of a normal-temperature sheet, and a color material can be fixed on a sheet by heating the sheet at a temperature above the line 601. A line 602 represents the decolorable line of a normal-temperature sheet, and the image with the color material on a sheet can be decolored by heating the sheet at a temperature above the line 602. Similarly, a dashed line 701 represents the fixable line of a heated high-temperature sheet, and a dashed line 702 represents the decolorable line of a high-temperature sheet.

In order to fix an image on a sheet clearly and decolor the image completely, it should be guaranteed that the temperature difference between a decoloring temperature and a fixation temperature is above a certain temperature. Further, it is easier to produce and install the image processing apparatus if the temperature difference is above the certain temperature. In FIG. 10, the temperature difference is indicated as T1. In FIG. 10, in the case of a normal-temperature sheet, the temperature difference T1 can be guaranteed at a predetermined conveyance speed S1. However, in the case of a high-temperature sheet, the temperature difference at the predetermined conveyance speed S1 is T2, thus, the temperature difference T1 is not guaranteed. In this case, a temperature difference (T1' shown in FIG. 10) greater than the temperature difference T1 can be guaranteed by lowering speed from S1 to S2. In the third embodiment, based on the feature, a control processing is carried out so that a high-temperature sheet is conveyed at a speed lower than a predetermined conveyance speed S1 at which the normal-temperature sheet is conveyed. That is, the heating time of the heater 121 is longer than the time required during the printing processing on the normal-temperature sheet. Further, even in a case of the high-temperature sheet, in order to make the amount of heat thereof equal to that of heating the normal-temperature sheet, a control processing is carried out so that heating temperature of the heater 121 is lower than that at the time of printing on the normal-temperature sheet.

FIG. 11 is a table exemplarily summarizing the operation controls according to the third embodiment. In the third embodiment, even in the case where a print job is carried out with a decolorable color material, the feed of a sheet from the decolored sheet cassette 213 is allowed if the time elapsing from the completion of a decoloring processing is short, not reaching a specified time. In this case, a control processing is carried out so that the heating time of the heater 121 is longer than the time required during the printing processing on the normal-temperature sheet. That is, the control unit 170 carries out a control processing so that the sheet is conveyed at a speed lower than a predetermined conveyance speed S1 (marked as a normal speed in FIG. 11) at which a normal-temperature sheet is conveyed during a printing process. On the other hand, in the case where a sheet is fed from the normal cassette 111, the sheet is set to be conveyed at the predetermined conveyance speed S1 so that the heater 121 can heat the sheet for a proper time to fix an image. Further, in the case where a long time elapses or a print job is carried out with a non-decolorable color material, a sheet fed from the de colored sheet cassette 213 and a sheet fed from the normal cassette 111 may be both conveyed at the predetermined conveyance speed S1. Further, the conveyance speed at which a sheet is conveyed after a long time elapses may be set to be different from that at which a sheet is conveyed in the case where a print job is carried out with a non-decolorable color material, in this case, the conveyance speeds are both set to be higher than a conveyance speed at which a high-temperature sheet is conveyed during a printing process.

Further, the predetermined conveyance speed is a preset value. The predetermined heating time refers to the time needed for the normal fixation of a normal-temperature sheet at the time of printing if the normal-temperature sheet is conveyed at the predetermined speed (preset value).

Figure 12:
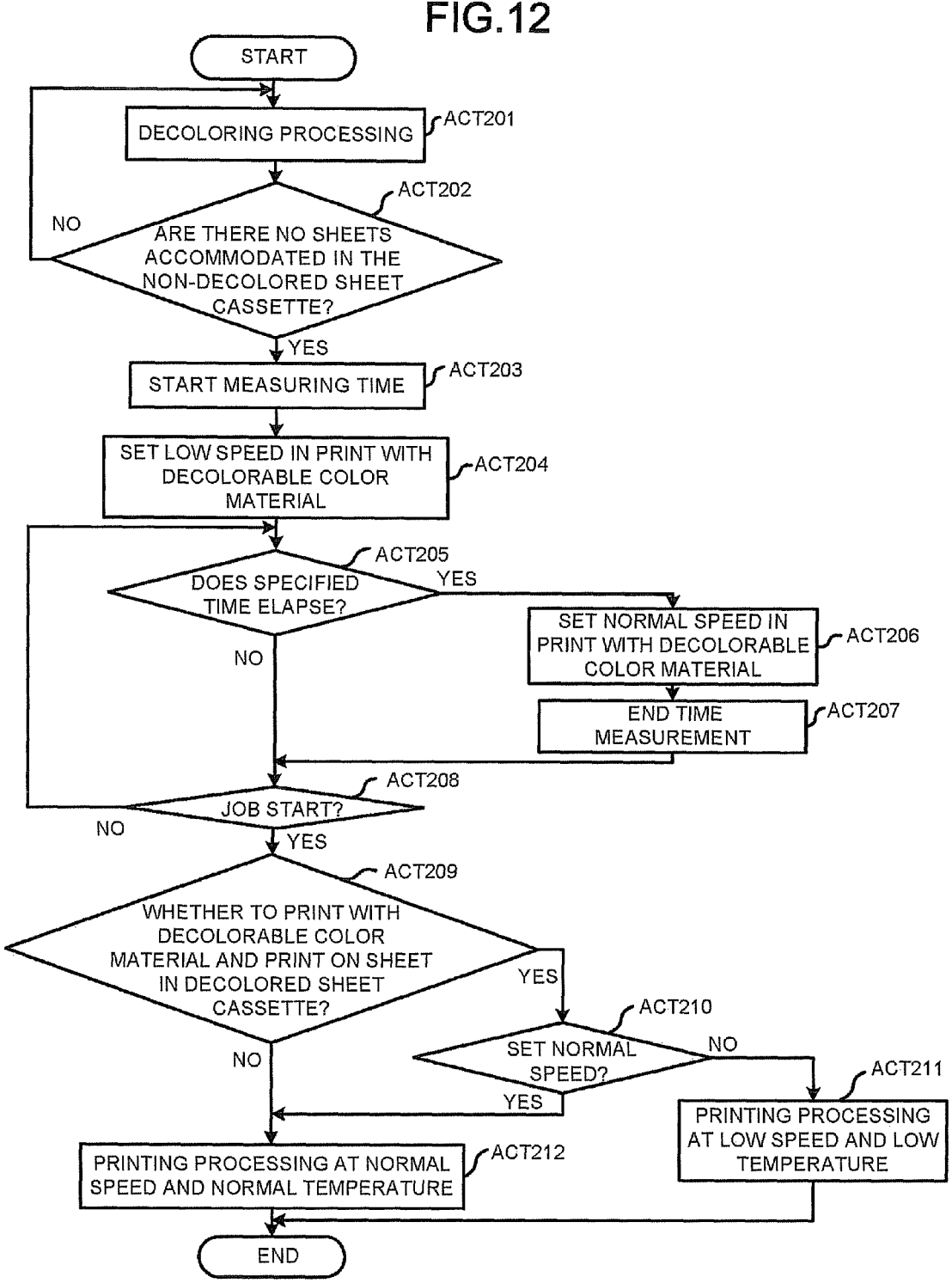
FIG. 12 is a flowchart exemplifying the operations carried out according to the third embodiment.

FIG. 12 is a flowchart exemplifying the operations carried out by the image processing apparatus 100 according to the third embodiment. Acts 201-203 carried out in the third embodiment are identical to Acts 001-003 carried out in the first embodiment and are therefore not described repeatedly here. The control unit 170 starts measuring time (Act 203) and sets that a print job based on a decolorable color material is carried out at a speed lower than the predetermined conveyance speed S1 (Act 204). In the third embodiment, the setting is made by writing a specified value into the third flag data pre-stored in the memory 182.

If the time elapsing fails to reach the specified time (Act 205: No), like the first embodiment, the control unit 170 determines whether or not there is a print job start instruction (Act 208), and the processing returns to Act 205 if there are no print job start instructions (Act 208: No).

It is set by the control unit 170 that the value of the third flag data is changed to the predetermined conveyance speed S1 (Act 206) if the time elapsing reaches the specified time (Act 205: Yes). The control unit 170 ends the time measurement (Act 207) and causes the processing to proceed to Act 208.

If a print job start instruction is received (Act 208: Yes), the control unit 170 determines whether or not the job is a job to be executed with the decolorable color material and a job to be executed on a sheet fed from the decolored sheet cassette 213 (Act 209). If the result of the determination of Act 209 is 'No' (Act 209: No), the control unit 170 controls the conveyance units 102 and 202 to convey the sheet at the predetermined conveyance speed S1 and carries out a printing processing with the image forming unit 115 (Act 212).

If the result of the determination of Act 209 is 'Yes' (Act 209: Yes), the control unit 170 determines, with reference to the value of the third flag data, whether or not the predetermined conveyance speed S1 is set (Act 210). In the case where a normal speed is set (Act 210: No), the conveyance units 102 and 202 are controlled to convey a sheet at a speed lower than the predetermined conveyance speed S1 so that the heater 121 can fix the image formed by the image forming unit 115 (Act 211). In this case, the control unit 170 controls the heater 121 so that the heating temperature (fixation temperature) of the heater 121 is lower than that in the case where a conveyance speed is set to the predetermined conveyance speed S1.

Figure 13:
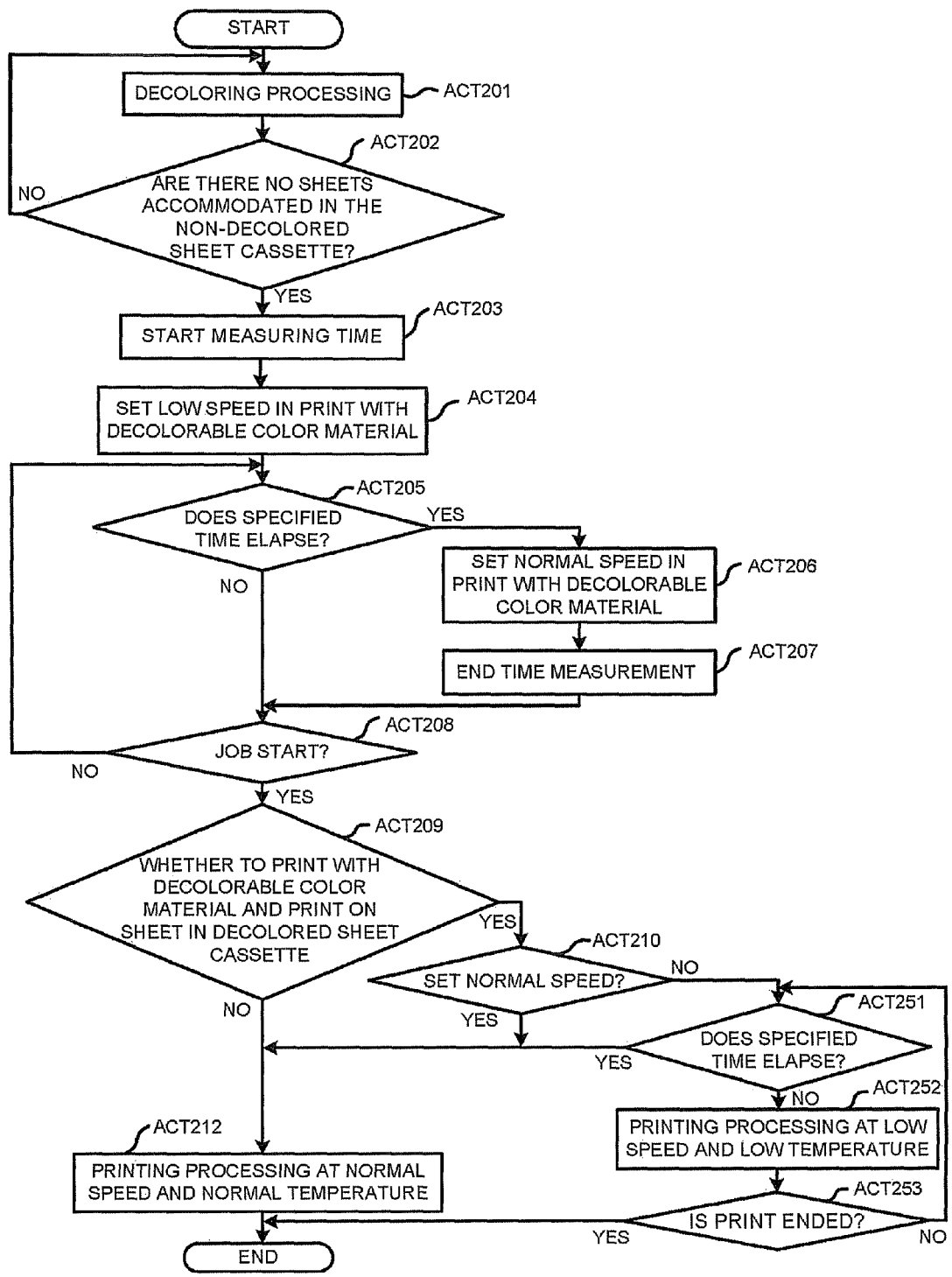
FIG. 13 is a flowchart exemplifying the operations carried out according to the third embodiment.

Further, there is also a case where the specified time is up during the execution process of a job. In this case, the conveyance speed may also be changed back to the predetermined conveyance speed S1 from the low speed S2. FIG. 13 exemplifies the operations carried out in this case. Acts 201-210 shown in FIG. 13 are identical to those shown in FIG. 12. In Act 210, if the third flag data represents a low-speed value (ACT 210: No), the control unit 170 determines whether or not the specified time elapses (Act 251). Herein, if the time elapsing fails to reach the specified time (Act 251: No), the control unit 170 controls a sheet to be conveyed at a low speed during a printing process (Act 252). At this time, the heater 121 is controlled so that the heating temperature of the heater 121 is lower than that in the case where a conveyance speed is set to the predetermined conveyance speed S1. The control unit 170 determines whether or not the execution of the job is ended (Act 253) and if so (Act 253: Yes), ends the processing. If the execution of the job is not ended (Act 253: No), the control unit 170 returns to Act 251 to determine whether or not the specified time elapses (Act 251). In this way, by determining whether or not a specified time elapses for each sheet, the control unit 170 can switch speeds even during the execution process of a job once the specified time elapses.

In accordance with embodiments, a printing operation can be executed on a decolored sheet before a specified time elapses.

The modes described in the first to third embodiments may be combined. Further, the operations described in the first to third embodiments may be switched according to the designation of the user on an operation mode.

In accordance with embodiments, a normal image can be obtained even if a print job is executed with a decolorable color material.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
    an image decoloring unit configured to decolor an image formed on a sheet with a decolorable color material by heating the sheet;
    an image forming unit configured to form an image on the sheet with the decolorable color material and a non-decolorable color material;
    a control unit configured to control the image forming unit to prevent the formation of an image with a decolorable color material during the period from the moment the image decoloring unit completes a decoloring processing to the moment a specified time elapses, and to allow the formation of an image with the decolorable color material after the specified time elapses, and to control the image forming unit to form an image with the non-decolorable color material no matter whether the specified time elapses or not in the case where images are formed with the non-decolorable color material, and
    a first accommodation unit disposed at a downstream side of the image decoloring unit in a sheet conveying direction and configured to accommodate the sheet processed by the image decoloring unit; and
    a second accommodation unit configured to accommodate the sheet at least unused on one side.

2. The image processing apparatus according to claim 1, further comprising: a display, wherein the control unit controls the display to display the time left before the specified time elapses during the period in which the image forming unit is controlled not to form an the image with the decolorable color material and the image forming unit to allow the formation of the image with the decolorable color material if the specified time elapses.

3. The image processing apparatus according to claim 1, wherein the control unit controls the decoloring processing before an image forming processing by the image forming unit.

4. The image processing apparatus according to claim 1, further comprising:
    a third accommodation unit configured to accommodate a sheet on which an image is formed with a color material.

5. The image processing apparatus according to claim 1, further comprising:
    a conveyance unit configured to convey the sheet respectively fed from the first or second accommodation unit to the image forming unit.

6. An image processing apparatus, comprising:
    an image decoloring unit configured to decolor an image formed on a sheet with a decolorable color material by heating the sheet;
    an image forming unit configured to form an image on the sheet with the decolorable color material and a non-decolorable color material;
    a control unit configured to control the image forming unit to prevent the formation of an image with a decolorable color material during the period from the moment the image decoloring unit completes a decoloring processing to the moment a specified time elapses, and to allow the formation of an image with the decolorable color material after the specified time elapses, and to control the image forming unit to form an image with the non-decolorable color material no matter whether the specified time elapses or not in the case where images are formed with the non-decolorable color material,
    a first accommodation unit disposed at a downstream side of the image decoloring unit in a sheet conveying direction and configured to accommodate the sheet processed by the image decoloring unit; and
    a second accommodation unit configured to accommodate a sheet on which an image is formed with a color material.

7. The image processing apparatus according to claim 6, further comprising: a display, wherein the control unit controls the display to display the time left before the specified time elapses during the period in which the image forming unit is controlled not to form an the image with the decolorable color material and the image forming unit to allow the formation of the image with the decolorable color material if the specified time elapses.

8. The image processing apparatus according to claim 6, wherein the control unit controls the decoloring processing before an image forming processing by the image forming unit.

\* \* \* \* \*